US011551225B2

(12) United States Patent
Gupta

(10) Patent No.: US 11,551,225 B2
(45) Date of Patent: Jan. 10, 2023

(54) LIVE CARD TRACKING

(71) Applicant: Bank of America Corporation, Charlotte, NC (US)

(72) Inventor: Saurabh Gupta, New Delhi (IN)

(73) Assignee: Bank of America Corporation, Charlotte, NC (US)

( * ) Notice: Subject to any disclaimer, the term of this patent is extended or adjusted under 35 U.S.C. 154(b) by 206 days.

(21) Appl. No.: 16/895,095

(22) Filed: Jun. 8, 2020

(65) Prior Publication Data

US 2021/0383390 A1     Dec. 9, 2021

(51) Int. Cl.
*G06Q 20/40* (2012.01)
*G06Q 20/10* (2012.01)
(Continued)

(52) U.S. Cl.
CPC ..... *G06Q 20/4015* (2020.05); *G06Q 20/1085* (2013.01); *G06Q 20/202* (2013.01);
(Continued)

(58) Field of Classification Search
CPC ............. G06Q 20/4015; G06Q 20/204; G06Q 20/3224; G06Q 20/34; G06Q 20/4016;
(Continued)

(56) References Cited

U.S. PATENT DOCUMENTS 9,317,847 B2 * 4/2016 Candelore ............ G06Q 20/325
9,640,060 B2    5/2017 Marra et al.
(Continued)

FOREIGN PATENT DOCUMENTS

WO   WO-2013039395 A1 *  3/2013  ............. A45C 13/42

OTHER PUBLICATIONS

Er. Monika Dureja, "ATM Card Tracking Using GPS System," www.ijaresse.com, International Journal of Advanced Research in Computer Science and Software Engineering, vol. 4, Issue 5, May 2014.

*Primary Examiner* — Florian M Zeender
*Assistant Examiner* — Milena Racic
(74) *Attorney, Agent, or Firm* — Weiss & Arons LLP

(57) ABSTRACT

A method for use with a smart card is provided. The smart card may include a communication interface, a housing, a microprocessor embedded in the housing, a battery for powering the communication interface and the microprocessor, and a nano GPS chip, located within the housing and in electronic communication with the communication interface and the microprocessor. The thickness of the smart card is preferably no greater than 0.8 millimeters ("mm") and has surface area not greater than 86 mm×54 mm. The method may include determining the location of the smart card in response to a request for a smart card transaction authorization and determining the location of a mobile device associated with a specified user of the smart card. Based on the location of the smart card and the location of the mobile device, the smart card may calculate a location delta between the smart card and the mobile device. If the location delta is greater than or equal to a threshold distance, the smart card may deny the request for smart card transaction authorization.

16 Claims, 5 Drawing Sheets

Live Updates

(51) Int. Cl.
*G06Q 20/34* (2012.01)
*G06Q 20/20* (2012.01)
*G06Q 20/32* (2012.01)
G10L 15/26 (2006.01)
G06F 40/20 (2020.01)

(52) U.S. Cl.
CPC ....... *G06Q 20/3224* (2013.01); *G06Q 20/341* (2013.01); *G06F 40/20* (2020.01); *G10L 15/26* (2013.01)

(58) Field of Classification Search
CPC . G06Q 20/1085; G06Q 20/202; G06Q 20/341
See application file for complete search history.

(56) References Cited

U.S. PATENT DOCUMENTS

| | | | |
|---|---|---|---|
| 10,198,731 B1* | 2/2019 | Spindel | G06Q 20/4016 |
| 10,554,411 B1* | 2/2020 | Ashfield | H04L 9/3213 |
| 11,176,541 B1* | 11/2021 | Gupta | G06F 3/167 |
| 11,182,773 B1* | 11/2021 | Gupta | G06Q 20/341 |
| 2013/0124346 A1* | 5/2013 | Baldwin | G06Q 20/20 |
| | | | 705/16 |
| 2016/0267486 A1* | 9/2016 | Mitra | G07F 7/0846 |
| 2019/0286805 A1* | 9/2019 | Law | G06F 21/34 |

* cited by examiner

LIVE CARD TRACKING

FIELD OF TECHNOLOGY

This disclosure relates to improving security of smart cards.

BACKGROUND OF THE DISCLOSURE

In today's fraud-prone and fast-moving world, there exists a need to track the physical location of debit/credit cards. For the purposes of the disclosure, the debit/credit cards may be understood to refer to any smart card that generally shares the dimensions of a typical debit/credit card and may, in certain circumstances and configurations, be used to perform transactions. Such tracking may be used to ensure that consumers' smart cards are safe.

Even if a debit/credit card is stolen, it is important to have a mechanism that physically tracks debit/credit cards so that a consumer can track and prevent the fraud.

Had there been a technology in place which would have enabled live tracking of debit/credit cards, it would have helped financial institutions, and users as well, prevent a large volume of undesired activity.

It would be desirable to produce a debit/credit card that includes a tracking system without disrupting the form factor typically associated with such a card.

It would further be desirable to produce a nano GPS chip for use with a debit/credit card without requiring that the form factor of the debit/credit card change.

SUMMARY OF THE DISCLOSURE

It is an object of this invention to produce a debit/credit card that includes a tracking system without disrupting the form factor typically associated with such a card.

It is a further object of this invention to produce a nano GPS chip for use with a debit/credit card without requiring that the form factor of the debit/credit card change substantially.

It is a yet further object of this invention to produce a nano GPS chip for use with a debit/credit card without requiring that the form factor of the debit/credit card change from the conventional footprint associated with a debit/credit card.

A smart card that reduces fraud associated with the smart card is provided. The smart card may include a communication interface, a housing, a microprocessor embedded in the housing, a battery for powering the communication interface and the microprocessor, a nano GPS chip, located within the housing and in electronic communication with the communication interface and the microprocessor and executable instructions stored in a non-transitory memory. When run by the microprocessor the instructions may determine the location of the smart card in response to a request for a smart card transaction authorization for a pre-determined transaction. The instructions may also determine the location of a mobile device associated with a specified user of the smart card, and formulate or otherwise calculate, a location delta based on the location of the smart card and the location of the mobile device. If the location delta is greater than or equal to a threshold distance, the smart card may deny the request for smart card transaction authorization. If the location delta is less than the threshold distance, then the smart card may grant the request for smart card transaction authorization.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
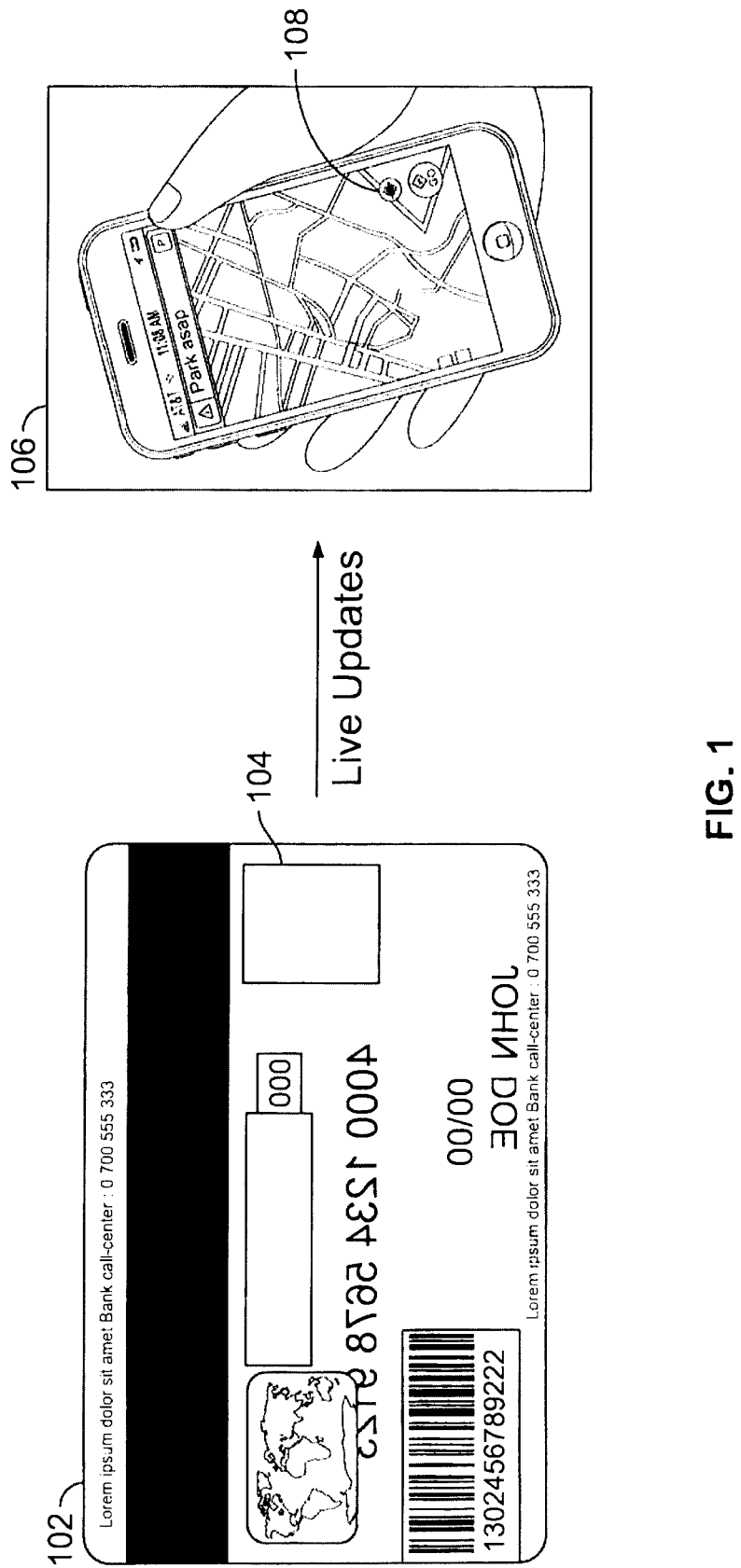
FIG. 1 shows a smart card and mobile device in accordance with the principles of the disclosure.

One aspect of the current disclosure relates to tracking technology. Such tracking technology preferably enables a debit/credit card to be tracked, preferably in real-time, using a global position system (GPS) nano chip preferably inbuilt into the smart card. In fact, the nano GPS chip is preferably embedded within the card itself.

One exemplary nano GPS chip is the Nano Spider™ manufactured by OriginGPS of Airport City, Israel. It should be noted that the Nano Spider™ is one of many such chips known in the art that can be used in embodiments according to the invention.

The Nano Spider, and other similar chips, are designed to support ultra-compact applications such as smart watches, wearable devices, trackers and digital cameras but they may also be used in embodiments in debit/credit cards—without altering the form factor of the card. Such chips are miniature, multi-channel, GPS solutions equipped with a regional overlay systems receiver. Such a receiver may be configured to periodically, substantially continuously, or continuously track all satellites in view. Such tracking provides real-time positioning data in the GPS industry's standard NMEA format.

Such a nano GPS chip can provide accuracy of approximately two meters, and tracking sensitivity of −163 dBm (decibels per milliwatt). In preferred embodiments of the invention, such chips may be sized with a footprint of a length and width of only 4.1 mm×4.1 mm or even smaller, and having a thickness of preferably no greater than about 0.18 mm. The chip size and thickness—4.1 mm×4.1 mm×0.18 mm—is well within the form factor that can be incorporated into a debit/credit card without disrupting the traditional form factor of the debit/credit card. For reference, an exemplary form factor of a smart card according to the embodiments may be about 53.98 mm×about 85.60 mm×about 0.8 mm (thick).

A nano GPS chip may provide accuracy and extremely fast fixes even under challenging signal conditions, such as indoor or temporarily covered.

Integrated GPS chips may incorporate high-performance microprocessor(s) and sophisticated firmware in order to keep positioning payload off the host, and thereby allow integration in embedded solutions with low computing resources—such as credit/debit cards according to the disclosure set forth herein.

Chip architecture can detect changes in context, temperature, and satellite signals to achieve a state of near continuous availability by maintaining and updating its internal fine time, frequency, and satellite ephemeris data while consuming only microwatts of battery power from the battery of the credit/debit card.

Such an embedded chip preferably enables credit or debit cards to be tracked using any device—e.g., a user's mobile phone or other mobile device (hereinafter, "mobile device"). This tracking preferably may be implemented independent of any prior pairing of the chip or card with the tracking device. The devices are preferably In addition, this tracking may also, in certain embodiments, enable periodic, or continual, updates, such as, for example, live (or, in the alternative, "real-time") hourly location updates, to be sent to user's mobile device.

In some embodiments, the user can go to a mobile application resident on his mobile device. The user can then view, on a display on the mobile device, the various card(s) which he or she has.

In such embodiments, a user can preferably select the card stored in its database and/or click on the 'track' feature in the display of the mobile device. In such embodiments, a pre-configured mobile app can display the live tracking of the card absent any prior concurrent pairing. Preferably, the mobile device will have the unique GPS identifier (stored on the GPS chip on card) associated with the card, in its database. In some embodiments, the mobile device will have access to all cards associated with the user by virtue of the fact that the mobile device can access the mobile financial services application associated with the user.

In certain embodiments, such periodic, or continual, updates may be sent to a mobile device preferably only if the device is configured to receive such updates. In certain embodiments, the mobile device may also be configured to display screenshots or a streaming screen display associated with such updates or such continual tracking.

Some embodiments of this technology may also equip debit/credit cards with a tracking screen in electronic communication, and for use, with the nano GPS chip. Such a screen may preferably enable card users to locate nearby Automated Teller Machines (ATMs) and other relevant locations.

In some embodiments, a user will preferably not need any mobile/smart device to join with the card prior to, during or after nano GPS chip utilization.

This technology according to the disclosure may also equip cards with an in-built NLP (Natural Language Processing) feature. In such embodiments, the NLP feature may preferably receive voice inputs and/or, in certain embodiments, output voice signals.

Certain embodiments may include a NIC (Network Interface Communication) card for WIFI connection. A NIC is a hardware component without which a computer can typically not be connected over a network. It is a circuit board installed in a computer that provides a dedicated network connection to the computer. It is also called a network interface controller, network adapter or LAN adapter. A NIC allows both wired and wireless communications. A NIC allows communications between computers connected via local area network (LAN) as well as communications over large-scale network through Internet Protocol (IP). A NIC is both a physical layer and a data link layer device—i.e., it provides the necessary hardware circuitry so that the physical layer processes, and some data link layer processes, can run on it.

Embodiments according to the disclosure can preferably act as a live—i.e., real-time—theft prevention technology by allowing the user to monitor the location of his or her smart card—especially when the card is not on the user's person. In certain embodiments, a card's nano GPS chip may include the intelligence to check a live—i.e., preferably real time—location of card transaction, compare it with the user's live location using user's mobile's device coordinates and/or history of recent mobile device usage—and stop transaction in case of suspicion.

Apparatus for a smart card are provided. Apparatus may increase transaction processing efficiency of an Automated Teller Machine ("ATM"), Point of Sale ("POS") devices or other self-service kiosks (referred to collectively herein as a "device").

The smart card may include a microprocessor. The smart card may include various other components, such as a battery, a speaker, and antennas. The microprocessor may have a thickness that is not greater than 0.25 millimeters ("mm"). The microprocessor may control overall operation of the smart card and its associated components. The smart card may include RAM, ROM, an input/output ("I/O") module and a non-transitory or non-volatile memory.

The I/O module may include a microphone which may accept user provided input. The I/O module may include one or more speaker(s) for providing audio output and a display for providing textual, audiovisual and/or graphical output—including but not limited to a display screen suitable for displaying a GPS-quality map.

Software may be stored within the non-transitory memory and/or other storage media. The software may provide instructions to the microprocessor for enabling the smart card to perform various functions. For example, the non-transitory memory may store software used by the smart card, such as an operating system, application programs, web browser and a database. Alternatively, some or all of computer executable instructions of the smart card may be embodied in hardware or firmware components of the smart card.

Application programs, which may be used by the smart card, may include computer executable instructions for invoking user functionality related to communication, authentication services, and voice input and speech recognition applications. Application programs may utilize one or more algorithms that encrypt information, process received executable instructions, interact with an ATM, perform power management routines or other suitable tasks.

The smart card may include non-transitory memory locations within the housing. The microprocessor may access such memory locations. The non-transitory memory locations may be included in the microprocessor. The non-transitory memory locations may store software, that when executed by the microprocessor, cause the smart card to perform various functions. For example, the microprocessor may instruct a communication interface to scan for a wired or wireless communication channels and connect to a detected ATM.

The smart card may include a pressure sensitive button. The pressure sensitive button may have a thickness that is not greater than 0.8 mm. The pressure sensitive button may be actuated by a user to activate the smart card. Actuation of the pressure sensitive button may provide an electronic signal to the microprocessor or any other component of the smart card. For example, actuating the pressure sensitive button may activate the microprocessor, a keypad or a communication interface of the smart card.

In some embodiments, the smart card may be activated in response to receiving high frequency wireless signals. The high frequency signals may be detected by the communication interface. The high frequency signals may be generated by a near field communication ("NFC") reader. The high frequency signals may provide power to one or more components of the smart card. In some embodiments, in response to receiving the power, the microprocessor may be activated and begin to draw power from a battery on the smart card.

The smart card may operate in a networked environment. The smart card may support establishing communication channels with one or more devices. The smart card may connect to a local area network ("LAN"), a wide area network ("WAN") or any suitable network. When used in a LAN networking environment, the smart card may be connected to the LAN through a network interface or adapter. The communication interface may include the network interface or adapter.

When used in a WAN networking environment, the smart card may include a modem or other means for establishing communications over a WAN, such as the Internet. The communication interface may include the modem. It will be appreciated that the network connections shown are illustrative and other means of establishing a communications link between devices may be used. The existence of any of various well-known protocols such as TCP/IP, Ethernet, FTP, HTTP and the like is presumed.

The smart card may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, mobile phones multiprocessor systems, microcomputers, minicomputers, mainframe computers, distributed computing environments that include any of the above systems or devices, and the like.

The smart card may utilize computer-executable instructions, such as program modules, being executed by the microprocessor. Generally, program modules include routines, programs, objects, components, data structures, etc. that perform particular tasks or implement particular abstract data types. The smart card may be operational with distributed computing environments where tasks are performed by remote processing devices that are linked through a communications network. In a distributed computing environment, program modules may be located in both local and remote computer storage media including memory storage devices.

The smart card may include one or more batteries. A battery of the smart card may be flexible. The battery may be a power source for electronic components of the smart card. For example, the battery may supply power to a keypad, the communication interface and the microprocessor. The battery may have a thickness that is not greater than 0.5 mm.

The battery may be recharged via an electrical contact, such as, for example, when the smart card is in contact with a device. The smart card's power source may include high frequency signals received from a device. The smart card may be configured to utilize received high frequency signals to recharge the battery or provide power to other components of the smart card.

The smart card may include an electrical contact. An electrical contact may be constructed using any suitable material that conducts or transfers electricity. The smart card may include a plurality of electrical contacts. An electrical contact may be accessible on any suitable face of a housing of the smart card. The contact may be accessible through a thickness of the housing. The contact may be utilized to transfer electrical charge to a rechargeable battery when the smart card is inserted into a device card reader.

The smart card may include a communication interface. The communication interface may have a thickness that is not greater than 0.8 mm. The communication interface may include circuitry for establishing electronic communication with a device. The communication interface may be configured to implement protocols for wireless communication. The communication interface may include one or more antennae for transmitting and receiving wireless signals.

The communication interface may include communication circuitry. The communication circuitry may include software and/or hardware for establishing a wired or wireless communication channel with the device. The communication interface may be compatible with illustrative wireless channels such as Wi-Fi, Bluetooth, Ethernet, NFC, satellite and cellular telecommunications. Wi-Fi may include passive Wi-Fi with lower power consumption than typical Wi-Fi. The communication interface may include a Near Field Communication ("NFC") chip. The NFC chip may communicate over a typical NFC range (~2 in.) when transmitting or receiving sensitive data. An illustrative NFC chip may utilize a 13.56 MHz radio frequency.

A microprocessor of the smart card may be configured to dynamically limit or expand transmitting and receiving ranges. The microprocessor may dynamically limit or expand transmitting and receiving ranges in response to a detected location of the smart card.

For example, the microprocessor may expand a communication range when the smart card is within a "familiar" zone. Expanding a communication range may include using a Wi-Fi communication channel rather than an NFC communication channel. Expanding a communication range may include using a typical Wi-Fi range such as 150-300 ft. when searching for an available wireless communication channel and using passive Wi-Fi after establishing the communication channel with the device.

A familiar zone may be a pre-defined radius from a user's home or work location. The microprocessor may limit a communication range when the smart card is within an "unknown" zone. For example, the microprocessor may limit a communication range when the user is travelling. The microprocessor may restrict the smart card to using NFC or contact-based communication channels when operating in an unknown zone.

In some embodiments, the smart card may be activated in response to receiving wireless signals from the device. The wireless signals may provide power to one or more components of the smart card. Illustrative wireless signals may include NFC signals. For example, in response to receiving power via the wireless signals, a microprocessor of the smart card may be activated.

The smart card may include a battery for powering the communication interface and the microprocessor. The smart card may include an electrical contact that may be used to establish a wired or contact-based connection to the ATM.

For example, the smart card may include an "EMV" chip. EMV is a technology that derives its name from the companies (Europay, MasterCard, and Visa) that helped develop the technology. When an EMV chip is inserted into a specialized card reader, the reader powers the EMV chip and the EMV chip generates a new authorization code each time it is used to authorize a transaction. Thus, simply copying information printed on the face of the smart card or encoded on a magnetic stripe may be insufficient to initiate a fraudulent transaction.

The EMV chip may function as an electrical contact. The EMV chip may include software and/or hardware for establishing a wired communication channel with the device. The battery of the smart card may be recharged via the at least one electrical contact when the smart card is in contact with a device via the EMV chip.

The smart card may include a housing. The housing may provide a protective layer for internal components of the smart card. The housing may be flexible. The housing may be constructed from plastic or other suitable materials. The housing may define a form factor of the smart card. The microprocessor and other components of the smart card may be embedded in, and protected by, the housing.

For example, an ATM may include a card reader constructed to receive a card that conforms to a predefined form factor. As illustrative form factor is defined in specifications published by the International Organization for Standardization ("ISO"). Illustrative specifications may include: ISO/IEC 7810, ISO/IEC 7811 and ISO/IEC 7816, which are hereby incorporated herein by reference in their respective entireties.

The smart card may include a keypad. The keypad may be mounted on an outside of the housing. The keypad may include mechanical keys. The keypad may be mounted on an outside of the housing. The housing of the smart card may conform to the predefined form factor. The keypad may not increase the form factor of the smart card defined by the device for receiving the smart card. For example, the housing and the keypad mounted on an outside of the housing may collectively have a thickness that is not greater than 0.8 mm. An entire surface area of the smart card, including the keypad, may not exceed 86 mm×54 mm.

The device may utilize information stored on the smart card to authenticate a user at the device. In addition to information stored on the smart card, the device may prompt the user for additional information before allowing the user to initiate a transaction at the device. The additional information may include a PIN or biometric feature.

After authenticating the user, the device may allow the user to initiate a transaction at the device. Illustrative transactions may include withdrawing cash, transferring funds between accounts or depositing cash/checks.

A user of the smart card may enter data using the keypad. The data entered by the user may be captured by the microprocessor. The user may enter data via the keypad that would typically be requested by the device when authenticating the user. The user may enter data via the keypad that would typically be requested by the device to initiate a transaction on behalf of the user.

The keypad may allow the user to enter data that will be needed by the device before accessing the device. Entering data before accessing the device may reduce an amount of time the user spends entering data after accessing the device. Reducing the amount of time the user spends entering data at the device may, in turn, reduce the amount of time other users spend waiting to access to the device. Reducing the amount of time each user spends entering data at the device may increase the number of transaction that the device may process per unit of time. Thus, reducing the amount of time a user spends entering data at the device may increase the transaction processing efficiency of the device.

Data entered using the keypad may include authentication information that would typically be requested by a device before providing a user access to one or more services of the device. For example, the user may enter a PIN or biometric feature. The authentication information may be encrypted and stored on the smart card. After capturing the authentication information, the smart card may present the authentication information to the device without requiring any further input from the user.

Other illustrative authentication information that may be entered via the keypad may include a user's name, an expiration date of the smart card, a card verification value ("CVV") or any other suitable data. The user may enter authentication information such as a telephone number, address or zip code.

Data entered using the keypad may include transaction information that would typically be requested by a device before implementing one or more services of the device. For example, the user may enter a cash withdrawal amount, currency, bill denomination and currency using the keypad before reaching the device. The smart card may transmit the keyed-in transaction information to the device without requiring any further input from the user. The smart card may instruct the device to execute the withdrawal transaction without requiring any further input from the user.

In some embodiments, data entered using the keypad may be transferred to the device when the smart card is inserted into or otherwise in communication with the device. In some embodiments, data entered using the keypad may be transferred to the device before the user inserts the smart card into the device. The data transferred to the device may be utilized by the device to complete transaction details that would have otherwise required prompting the user for inputs at the device. Capturing the data on the smart card before the user accesses the device reduces the amount of time a user needs to spend entering data at the device, thereby increasing the transaction processing efficiency of the device.

The smart card may include executable instructions. The executable instructions may be stored in a non-transitory memory. The executable instructions, when run by the microprocessor, may implement various functions of the smart card. The microprocessor may capture data entered using the keypad. The microprocessor may encrypt the captured data. The smart card may include a dedicated encryption controller for performing the encryption. The microprocessor may store the encrypted data locally on the smart card.

The microprocessor may formulate a set of transaction instructions executable by the device. The transaction instructions executable by the device may be formulated based on the data (e.g., transaction and authentication information) captured by the keypad. For example, the microprocessor may formulate transaction instructions for executing a transaction at the device. The microprocessor of the smart card may integrate the data captured from the keypad into the set of transaction instructions that are executable by the device.

The smart card may transfer the transaction instructions to the device. The smart card may transfer the transaction instructions in response to establishing a communication channel with the device. The communication interface may be used to establish the communication channel. For example, the smart card may establish the communication channel when the smart card is inserted into a card reader of the device. The device may autonomously initiate a transaction based on the authentication/transaction information included in transaction instructions stored on the smart card, thereby improving the transaction processing efficiency of the device.

For example, using the keypad, the smart card may capture a PIN and withdrawal amount from a user. The smart card may formulate a withdrawal request for the amount entered by the user. The smart card may formulate the withdrawal request before the user inserts the smart card into the device. The smart card may transfer the withdrawal request to the device for execution when the smart card is within a communication range of the device.

The smart card may include a communication interface that includes a wireless communication interface. The smart card may scan for a wireless communication channel broadcast by the device. The smart card may attempt to establish a connection to the device using the detected wireless communication channel. The smart card may establish the wireless communication channel to the device before the smart card is inserted into the device.

The wireless communication channel may be used for transferring transaction instructions previously formulated by the smart card. In response to receiving transaction instructions, the device may initiate pre-processing of the user's desired transaction.

Pre-processing may include verifying any authentication information included in the set of transaction instructions. Pre-processing may include verifying that the user has sufficient funds available to warrant dispensing cash to the user. The pre-processing may determine that further input is needed from the user before dispensing cash.

For example, a user's account or device location may be associated with a specific fraud-mitigating protocol. The fraud-mitigating protocol may require a user to provide additional authentication information or verify previously provided authentication information before the device executes the transaction instructions received from the smart card.

The device may complete any pre-processing before the user approaches the device and inserts the smart card into the device. After completing the pre-processing, the device may detect that the smart card has been inserted into the device. The device may determine that it has pre-processed transaction instructions received from the smart card. The device may then execute the transaction implemented by the previously received transaction instructions without prompting the user for any additional data or inputs.

From a perspective of the user, the transaction may be executed in real time after the smart card is inserted into the device.

In some embodiments, transaction instructions formulated by the microprocessor and stored locally on the smart card may not be transferred to the device before the smart card is inserted into the device. The built-in security protocols of an EMV chip on the smart card may provide verification of authentication information. After the device authenticates the user and the inserted smart card using the EMV chip, the smart card may then transfer the set of transaction instructions to the device.

Transaction instructions may be transferred to the device using a contact-based communication channel, such as via the EMV chip of the smart card. Such embodiments may provide an additional layer of fraud-mitigation by reducing the possibility that the set of transaction instructions may be intercepted during wireless transmission to the device. In some embodiments, even when the smart card is inserted into the device, transaction instructions may be transferred to the device using a wireless communication channel.

In some embodiments, the smart card may capture authentication information. The smart card may encrypt the authentication information and store the authentication information locally on the smart card. The smart card may transfer the authentication information to the device. After receiving the authentication information, the device may not prompt the user for authentication information.

After the user inserts the smart card into the device, the smart card may interact directly with the device, without requiring any further authentication information from the user. The smart card may transfer the authentication information to the device in response to an authentication request submitted by the device directly to the smart card. The user may trigger the device to request the authentication information. For example, inserting the smart card into the device may trigger a request for authentication information. Actuating a button on the device may trigger a request for authentication information.

Transaction instructions may be formatted in a fashion that is understandable for processing by a device. The device may autonomously decrypt transaction instructions received from the smart card. The device may autonomously execute the transaction instructions and initiate a transaction (e.g., withdrawal) based on the transaction information (e.g., withdrawal amount and account) previously entered by the user. Transaction instructions formulated by the microprocessor may be sufficient to execute the transaction without the device prompting the user for additional data. The device may dispense the requested amount of cash to the user without requiring the user to enter any information at the device after inserting the smart card into the device.

The smart card may encrypt data entered by the user. The device may decrypt data it receives from the smart card. The smart card may encrypt all data entered by the user via the keypad. The smart card may encrypt less than all of the data associated with a set of transaction instructions. For example, the smart card may only encrypt a PIN or other authentication information.

Limiting the amount of data encrypted by the smart card may allow the smart card to use less power to function. Using less power may improve the functionality of the smart card by extending its battery life and extending the amount of time between charging.

Limiting the amount of data encrypted by the smart card may improve functionality of the device. The device may only need to decrypt selected data and not an entire set of transaction instructions. This may speed up a response time of the device when processing transactions instructions received from eh smart card. Limiting the amount of data that needs to be decrypted by the device may further increase the transaction processing efficiency of the device per unit of time.

The microprocessor may be configured to delete data from the smart card after expiration of a pre-determined time period. For example, the microprocessor may be configured to delete transaction instructions or authentication information stored on the smart card after expiration of a pre-determined time period.

The keypad of the smart card may have an inactive state. In the inactive state, the keypad may not capture data entered using the keypad. For example, in the inactive state, the microprocessor may not supply power to the keypad. In the inactive state, the microprocessor may not capture data entered using the keypad.

The keypad may have an active state. In the active state, the keypad may be capable of capturing data entered by a user. In the active state, the microprocessor may supply power to the keypad. In the active state, the microprocessor may capture and/or encrypt data entered by the user using the keypad.

The inactive state of the keypad may be a default state. When the keypad is in the inactive state, data entered using the keypad of the smart card is not captured by the microprocessor. The microprocessor may toggle the keypad between the inactive and active states. For example, the microprocessor may activate the keypad in response to establishing a communication channel with a device.

A system for increasing transaction processing efficiency of a device is provided. The system may include a smart card having a thickness not greater than 0.8 mm. The smart card may have a width not greater than 54 mm. The smart card may have a length not greater 86 mm.

The system may include a communication interface. The communication interface may be embedded in the smart card. The communication interface may include hardware and software for communicating with a device. For example, the smart card may include circuitry for communicating over Wi-Fi, NFC, Bluetooth, cellular, satellite or any suitable wireless network or protocol. The communication interface may include a wired communication interface. For example, the smart card may include circuitry and externally accessible electrical contact(s) for communicating over a wired Ethernet or any suitable wired network or protocol.

The system may include a microprocessor. The microprocessor may be embedded in the smart card. The microprocessor may control communication conducting using the communication interface. For example, the microprocessor may initiate communication with a device using the communication interface. The microprocessor may terminate communication with the device by turning off the communication interface. Turning off the communication interface may include disconnecting from the device. Turning off the communication interface may include terminating communication channel with the device. Turning off the communication interface may include cutting off power supplied to the communication interface.

The system may include a user input system. The user input system may be in electronic communication with the microprocessor. The user input system may include a keypad. The user input system may include an input controller. The input controller may capture data entered using the keypad. The user input system may include a voice controller. The voice controller may capture voice commands. The voice controller may generate an audio message confirming data captured by the input controller. The user input system may include an encryption controller. The encryption controller may encrypt data captured by the input controller and/or the voice controller.

The system may include machine executable instructions. The executable instructions may be stored in a non-transitory memory on the smart card. In some embodiments, the executable instructions may be stored in a non-transitory memory on the device. The executable instructions, when run by the microprocessor, may self-authenticate a user or the smart card. The self-authentication may be conducted over a communication channel established using the communication interface. The communication channel may be a secure communication linking the smart card and the device.

The executable instructions, when run by the microprocessor on the smart card may formulate transaction instructions executable by the device. The transaction instructions may be formulated based on the data stored on the smart card. Transaction instructions may be formulated before a secure communication channel is established between the smart card and the device. For example, a user of the smart card may enter data using the keypad when the user is at home. While at home, the smart card may not be within a communication range of a device.

Formulated transaction instructions may be transferred to a device over a secure communication channel linking the smart card and the device. A device may only establish a secure communication link with the smart card when the smart card is within a threshold distance of the device. When the smart card is within the threshold distance, the smart card may be likely or expected to access the device. In some embodiments, the secure communication link may only be established when the user initiates a request to establish the secure communication link.

Transaction information or instructions stored locally on the smart card may be used to stage a transaction at the device. A staged transaction may include all data needed to execute a transaction at the device without requiring further input from a user. For example, for a withdrawal transaction, the transaction instructions may include transaction/authentication information such as a PIN, the amount to be withdrawn and the account funds are to be withdrawn from.

When the device receives the transaction instructions, the device may verify that the PIN is associated with the account. The device may also verify that the account includes sufficient funds to fulfill the withdrawal request. After conducting the verification, the device may execute the transaction instructions. The user of the smart card may not need to input any additional information after the transaction information/instructions are transferred to the device.

In some embodiments, after conducting the verification of the PIN and sufficient funds, the device may await confirmation from the user before executing the transaction. For example, the device may receive the transaction instructions over a wireless communication channel. The device may receive transaction instructions over the wireless communication when the smart card is outside a threshold distance from the device. The user of the smart card may enter data used to formulate the transaction instructions when the user is at home or at work. The transaction instructions may be transmitted to the device over a Wi-Fi or cellular communication channel.

Transaction instructions may be transmitted from the smart card to a target device. The transaction instructions may be transmitted to a cloud computer system. When the smart card establishes a wired or wireless connection to the device, the device may check whether transaction instructions associated with the smart card are stored on the device or in the cloud computing system.

In some embodiments, after storing transaction instructions locally on the smart card, a flag may be set on the smart card. The device may be configured to check the flag and determine whether transaction instructions have been formulated by the smart card.

In some embodiments, the device may require authentication before establishing a connection with the smart card. For example, the device may require entry of the PIN or submission of a biometric feature before executing transaction instructions received from the smart card. Executing transaction instructions received from the smart card may reduce the number of user inputs required at the device. Reducing the number of user inputs at the device improves the transaction processing efficiency of the device.

The microprocessor may configure the smart card to purge transaction instructions when a device does not establish a wired or contact-based communication channel with the smart card within a pre-determined time period. A cloud computing system may receive transaction instructions at a first time. When a device accessible to the cloud computing system does not establish a connection to the smart card by a second time, the cloud computing system may purge the received transaction instructions.

In some embodiments, the interval between the first and second times may be set by the cloud computing system. The cloud computing system may assign a default interval to transaction instructions received from the smart card. The cloud computing system may assign a longer or shorter time interval based on a distance between a current location of the smart card transmitting the transaction instructions and a location of a device. The system may use a machine leaning algorithm to determine an interval that provides sufficient time for the smart card user to travel to and access the device.

The machine learning algorithm may take account of traffic patterns, time of day and typical user behavior. For example, if transaction instructions are received closer to the end of a workday, the interval may be shorter than if the transactions instructions are received earlier in the workday.

The system may include a front controller. The front controller may be included in the device. Using a device communication channel, the front controller may receive encrypted input data from the smart card via the communication interface. The encrypted data may include transaction instructions. Transaction instructions may be received by the front controller from a cloud computing system.

The system may include a decryption controller. The decryption controller may be included in the device. The decryption controller may decrypt encrypted data received by the device from the smart card.

The system may include an input validation controller. The input validation controller may communicate with a remote computer server. The remote computer serer may be a cloud computing system. The remote computer server may validate encrypted data received from the smart card. Validating the encrypted data may include verifying whether transaction instructions received from the smart card are associated with a valid PIN or other valid authentication information. Validating the encrypted data may include verifying whether transaction instructions are associated with sufficient funds for a specified transaction or account.

The system may include a payment dispatcher. The payment dispatcher may be included in the device. The payment dispatcher may dispense cash or other items in response to a positive validation received from the input validation controller.

The smart card may include a wireless communication interface. The microprocessor may instruct the wireless communication interface to scan for a wireless device communication channel. A wireless device communication channel may only be detectable when the smart card is within a threshold distance of a device. For example, the device wireless communication channel may be purposefully configured to have a maximum transmission range that is limited to a threshold distance from the device. An illustrative distance may include a maximum NFC communication range.

In response to detecting the wireless device communication channel, the smart card may transfer transaction instructions to the device over the wireless device communication channel. The device may pre-stage a transaction based on received encrypted transaction instructions. The device may execute the pre-staged transaction only after establishing contact-based communication with the smart card.

The microprocessor may purge encrypted data stored on the smart card when contact-based communication with the device is not established within a pre-determined time period. The device may purge transaction instructions received from the smart card when contact-based communication is not established with the smart card within a pre-determined time period.

Apparatus for a smart card that improves transaction processing efficiency of a device, POS or other self-service kiosk is provided. The smart card may include a housing that defines a form factor of the smart card. The smart card may include hardware components such as a communication interface, a microprocessor and a battery.

The touch-sensitive surface may utilize any suitable touch detection technology such as surface acoustic wave, optical imaging, infrared acrylic projection or acoustic pulse recognition technologies.

The smart card may include a touch-sensing controller for detecting a touched surface location. The touch-sensing controller may include an application-specific integrated circuit (ASIC) chip and a digital signal processor (DSP) chip.

In some embodiments, the touch-sensitive surface may provide "single-touch" functionality. Single-touch functionality may detect input from one touch point on the touch-sensitive surface. For example, the touch-sensitive surface may display a list of options and the user may select one of the options by touching or otherwise selecting the desired option. Single-touch functionality may also recognize double taps or a long-press functionality.

In some embodiments, the touch-sensitive surface may provide "multi-touch" functionality. Multi-touch functionality may detect input from two or more simultaneous touch points applied to the touch-sensitive surface. For example, pinch-to-zoom is a multi-touch functionality.

The touch-sensitive surface may include organic light emitting diode ("OLED") technology. A touch-sensitive surface constructed using OLED technology may have a thickness that is not greater than 0.25 mm. OLEDs may be flexible. The microprocessor may configure a touch-sensitive surface constructed using OLEDs to display information.

OLEDs are typically solid-state semiconductors constructed from a thin film of organic material. OLEDs emit light when electricity is applied across the thin film of organic material. Because OLEDs are constructed using organic materials, OLEDs may be safely disposed without excessive harm to the environment. Furthermore, OLEDs may be used to construct a display that consumes less power compared to other display technologies.

The smart card may include a haptic response system. The haptic response system may provide a responsive force, vibration or movement in response to receiving a touch input. For the example, the haptic response system may provide a responsive vibration to a touch-based selection of a displayed option. The haptic response system may include an eccentric (unbalanced) rotating mass, a linear resonant actuator, a piezoelectric actuator or any other suitable hardware for providing haptic responses.

The microprocessor and associated hardware may interpret finger or stylus motion applied to the touch-sensitive surface. For example, the microprocessor may translate the finger or stylus motion into digital transaction information. The microprocessor may translate the finger or stylus motions into digital transaction instructions. The microprocessor may encrypt the captured motions.

The microprocessor may save captured finger or stylus motion locally on the smart card. The microprocessor may translate the captured motion into transaction information or instructions. The motion of the stylus, as translated by the microprocessor may be presented on the touch-sensitive surface.

For example, the microprocessor may translate the captured motion into entry of PIN. The microprocessor may translate the captured motion into entry of an amount of cash desired to be withdrawn from a device. The microprocessor may translate the captured motion into entry of an account the user desires to withdraw the cash from. The microprocessor may generate at least two transaction options based on captured stylus motion. The microprocessor may present the generated transaction options for selection on the touch-sensitive surface.

The microprocessor may formulate a set of transaction instructions executable by the ATM, POS or other kiosk based on captured stylus motion. The microprocessor may formulate transaction instructions executable by the device based on a user's touch-based selection of transaction options displayed on the touch-sensitive surface. The user may provide touch-based confirmation of the accuracy of transaction instructions formulated by the microprocessor.

The microprocessor may encrypt the transaction instructions. In response to establishing a communication channel with a device, the microprocessor, using the wireless interface, may trigger autonomous execution of a transaction at the kiosk by transferring transaction instructions from the smart card to the kiosk. The transaction instructions, when received by a kiosk, may autonomously initiate a transaction at the kiosk.

Triggering autonomous execution of a transaction may refer to initiating a transaction at a kiosk based on receiving transaction instructions from the smart card without the kiosk prompting for, or waiting to receive, any additional input data from a user. Triggering autonomous execution of a transaction may therefore improve the transaction processing efficiency of the kiosk by reducing delays associated with the kiosk prompting for and, waiting to receive responses to, additional data inputs such as transaction or authentication information.

In response to establishing a communication channel with a device, using the communication interface, the microprocessor may transfer formulated transaction instructions to a device. The communication interface may include a wireless communication circuit. The microprocessor may initiate a transaction at a kiosk in response to establishing a wireless communication channel with the kiosk.

The microprocessor may trigger autonomous execution of a transaction at the kiosk by transferring transaction instructions to the kiosk over the wireless communication channel. The microprocessor may capture and translate stylus motion at a first location. The microprocessor may trigger execution of a transaction, based on the captured motion, at a second location. The smart card may transfer the transaction instructions to the second location using the communication channel.

The microprocessor may require a touch-based confirmation from the user before transmitting transaction instructions to a kiosk. The microprocessor may display a confirmatory message on the touch-sensitive surface and require the user to register confirmation by touching (e.g., using a stylus) a target area of the surface. For example, the target area may include a check box displayed adjacent to the confirmatory message. The user may touch the check box to register confirmation of a displayed message.

In some embodiments, the smart card may include a fingerprint reader embedded within, or underneath the touch-sensitive surface. The user may register confirmation of transaction instructions by submitting a fingerprint using the embedded fingerprint reader. The microprocessor may confirm transaction instructions by determining whether the fingerprint by the user provided matches a known fingerprint securely stored locally on the smart card.

In some embodiments, the microprocessor may display the target area associated with a confirmatory message overlaid above the embedded fingerprint reader. By pressing a finger against the target area, the microprocessor may register confirmation of the transaction instructions by registering the user's touch confirmation in the target area and simultaneously submit a fingerprint for verification. The transaction may only be executed when the microprocessor successfully registers the user's touch confirmation and validates the submitted fingerprint.

In some embodiments, the smart card may include an electrical contact. The microprocessor may only transfer transaction instructions to the kiosk and thereby initiate a transaction at the kiosk in response to establishing a contact-based communication channel with the kiosk. Establishing a contact-based communication channel with the kiosk may ensure the user and smart card is physically present at the kiosk. Establishing a contact-based communication channel with the kiosk may ensure the user is currently accessing the kiosk. A battery of the smart card may be recharged via the at least one electrical contact when the smart card is in contact-based communication with the kiosk.

The touch-sensitive surface may have an inactive state. In the inactive state, the touch-sensitive surface may be unable to capture data such as stylus touch inputs. When the touch-sensitive surface is in the inactive state, stylus touch inputs applied to the touch-sensitive surface are not captured by the microprocessor.

The touch-sensitive surface may have an active state. In the active state, the touch-sensitive surface is capable of capturing data, such as a user's touch inputs. The inactive state may be a default state of the touch-sensitive surface. A default inactive state may avoid the microprocessor capturing inadvertent or unintentional touch inputs.

The microprocessor may toggle the touch-sensitive surface from the inactive state to the active state. The microprocessor may toggle the touch-sensitive surface from the active state to the inactive state. For example, the microprocessor may toggle the touch-sensitive surface from the inactive state to the active state in response to establishing a communication channel with a kiosk. The microprocessor may toggle the touch-sensitive surface from the inactive state to the active state in response to determining that the communication interface is within a communication range of a kiosk.

In some embodiments, a smart card may include a touch-sensitive surface and a keypad. The keypad may be a mechanical keypad. In such embodiments, the housing and the keypad collectively may have a thickness that is not greater than 0.8 mm. In some embodiments, the smart card may only include a touch-sensitive surface. The touch-sensitive surface may be configured to display a virtual keypad. The virtual keypad may include a display of input buttons that may be touch-selected by the user. In such embodiments, the housing and the touch-sensitive surface collectively may have a thickness that is not greater than 0.8 mm.

The smart card may include a voice controller. The voice controller may generate an audio message confirming the microprocessor's interpretation of the touch inputs (e.g., stylus motion) applied to the touch-sensitive surface and captured by the input controller. The microprocessor may prompt the user to touch a target area of the screen to confirm an accuracy of the generated audio message. In response to receiving the user's confirmation, the microprocessor may generate transaction instructions for executing the transaction identified in the audio message and confirmed by the user.

The smart card may include an encryption controller. The encryption controller may encrypt data captured by the input controller. The encryption controller may encrypt the transaction instructions formulated by the microprocessor.

The microprocessor may self-authenticate the smart card to a device. Self-authentication may include providing a kiosk with authentication credentials stored locally on the smart card. The self-authentication process may not prompt the user or require any inputs from the user. Authentication credentials may include a PIN or a biometric feature. The authentication credentials may be provided by the user during a process of entering transaction or authentication information.

In some embodiments, the user may be required to enter authentication credentials each time transaction information is entered into the smart card. In some embodiments, the smart card may only require the user to enter authentication credentials after expiration of a pre-determined time period. The kiosk may be configured to verify authentication credentials provided by the smart card before executing transaction instructions received from the smart card. The kiosk may communication with a remote computer system to verify authentication credentials or information included in transaction instructions received from the smart card.

A system for improving transaction processing efficiency of a device is provided. The system may include a smart card having a thickness not greater than 0.8 mm and a surface area not greater than 86 mm×54 mm. The smart card may include a communication interface and a microprocessor. The smart card may include a user input system in electronic communication with the microprocessor.

The user input system may include a stylus and a touch-sensitive surface. The touch-sensitive surface may capture motion of the stylus against or applied to the touch-sensitive screen. The user input system may include an input controller. The input controller may decipher captured motion of the stylus. The input controller may formulate transaction instructions based on the deciphered motion.

The user input system may include an encryption controller. The encryption controller may encrypt the formulated transaction instructions.

The smart card may include a non-transitory memory that stores executable instructions, such as software or firmware. The executable instructions, when run by the microprocessor, may implement various functions of the smart card.

A surface area of the smart card may define a front face and a back face. The touch-sensitive surface may include a first writing surface on the front face. The touch-sensitive surface may include a second writing surface on the back face.

The smart card may include a voice controller. The voice controller may generate an audio message confirming transaction or authentication information entered by the user. The voice controller may generate an audio message confirming an interpretation (by the microcontroller or input controller) of stylus motion applied by the user to the touch-sensitive surface. The voice controller may generate an audio message confirming transaction instructions formulated by the input controller. The microprocessor may require the user to register confirmation of the audio message by touching a target area of the touch-sensitive surface.

Methods for improving transaction processing efficiency of a card-processing device, or other self-service kiosks are provided. Methods may include capturing motion of a stylus when moved or pressed against a touch-sensitive surface of the smart card. Methods may include formulating transaction instructions based on the captured stylus motion. Methods may include encrypting the transaction instructions.

Methods may include storing transaction instructions locally on the smart card. Methods may include transferring transaction instructions from the smart card to a kiosk. The transfer may trigger execution of a transaction at the kiosk without requiring any input from a user of the smart card after the kiosk receives the transaction instructions.

Methods may include capturing stylus motion at a first location and at a first time. The first location may be a user's home or other location within a familiar zone. Methods may include transferring the transaction instructions to the kiosk at a second location and at a second time. For example, the transaction instructions entered by the user at home, may be transferred to a device after the user leaves work for the day.

Methods for improving transaction processing efficiency of a card-processing device are provided. Methods may include capturing transaction information using a keypad embedded in a smart card. Methods may include formulating transaction instructions based on the transaction information captured via the keypad.

Methods may include encrypting the transaction information. Methods may include storing the encrypted transaction information locally on the smart card. Methods may include encrypting the transaction instructions. Methods may include storing the encrypted transaction instructions locally on the smart card.

Methods may include transferring the encrypted transaction instructions from the smart card to a device. Methods may include formulating a staged transaction at the device based on the encrypted transaction information. The staged transaction may include transaction and authentication information needed for the device to execute a transaction autonomously, without requiring additional user input. Methods may include executing the staged transaction without receiving any input from a user of the smart card after transferring the transaction instructions from the smart card to the device.

In some embodiments, the smart card may encrypt transaction information entered by a user. Methods may include providing audio confirmation to the user of the smart card. The audio confirmation may provide an audible articulation of the transaction information or instructions stored locally on the smart card.

Methods may include transferring information such, such as transaction instructions, from the smart card to the device using a contact-based communication channel. Methods may include transferring information from the smart card to the device using a wireless communication channel. In some embodiments, the smart card may transmit transaction or authentication information to the device. The device may formulate transaction instructions based on the received transaction and authentication information. The device may execute a transaction on behalf of the smart card user using transaction instructions formulated based on information received from the smart card.

In certain embodiments, a system including a smart card having a thickness not greater than 0.8 millimeters ("mm") and a surface area not greater than 86 mm×54 mm is described herein. Such a smart card may include a communication interface, a housing, a microprocessor embedded in the housing, a battery for powering the communication interface and the microprocessor, a nano GPS chip, located within the housing and in electronic communication with the communication interface and the microprocessor, and executable instructions stored in a non-transitory memory.

When run by the microprocessor, the instructions may determine the location of the smart card in response to a request for a smart card transaction authorization or in response to receipt of another suitable request.

The instructions may also determine the location of a mobile device associated with a specified user of the smart card.

In certain embodiments, the instructions may formulate a location delta—i.e., a physical distance between the smart card and mobile device—based on the location of the smart card and the location of the mobile device. In some embodiments, when the location delta is greater than or equal to a threshold distance, the system may deny the request for smart card transaction authorization. This may be considered as one type of fraud protection because it limits the ability to use the card to preferably only a situation when the card is within a pre-defined distance of the user's mobile device. Accordingly, if the location delta is less than the threshold distance, then the system may preferably grant the request for smart card transaction authorization. It should be noted that the conditions for granting or denying the transaction authorization may also be dependent on factors other than proximity of the user's mobile device and the smart card. Such factors may include biometric factors associated with the user and/or other suitable, preferably security-related factors.

The smart card may, in certain embodiments, include a display screen. The display screen may preferably operate in conjunction with the microprocessor and nano GPS chip to present location information derived from the nano GPS chip, as translated by the microprocessor.

In some embodiments, the microprocessor may configure the display screen to present location information of a nearby Automated Teller Machine or other relevant device. Such information may be derived from an electronic communication received by the communications interface from a remote location or from some other suitable information source.

In certain embodiments, the microprocessor may include instructions to trigger a periodic update transmitted from the communication interface to the mobile device. The periodic update may set forth the location of the smart card.

In some embodiments, the system may establish a wireless communication channel with one of an ATM and a point of sale device (POS). The microprocessor may then trigger execution of the transaction at the one of the ATM and the POS by transferring transaction instructions to the one of the ATM and the POS over the wireless communication channel.

The communication interface may include at least one electrical contact. In certain embodiments, the executable instructions, when run by the microprocessor, may trigger execution of the transaction at the one of the ATM and the POS by establishing a contact-based communication channel with the one of the ATM and the POS.

The housing and the nano GPS chip, when seated within the housing, may collectively have a thickness that is not greater than 0.8 millimeters ("mm").

In some embodiments, the smart may also include a microphone. The microphone may be configured to receive analog voice signals. The smart phone may then convert the voice signals received by the microphone into digital signals using Natural Language Processing (NLP). The microprocess may convert the digital signals into readable text and store the converted digital signals.

In some embodiments, the smart card further may include a speaker. The smart card may be configured to convert digital sound signals generated by the smart card into comprehensible analog signals. The analog signals may be played using the speaker.

Certain embodiments may include the following method steps.

The steps may include determining the location of the smart card in response to a request for a smart card transaction authorization and determining the location of a mobile device associated with a specified user of the smart card. Once both locations have been determined, the method may also include, for example, formulating a location delta—i.e., a distance between the mobile device and the smart card—based on the location of the smart card and the location of the mobile device.

If the location delta is greater than or equal to a threshold distance, the smart card (or other computing device) may be configured to deny the request for smart card transaction authorization. If the location delta is less than the threshold distance, then the smart card (or other computing device) may be configured to grant the request for smart card transaction authorization.

Apparatus and methods in accordance with this disclosure will now be described in connection with the figures, which form a part hereof. The figures show illustrative features of apparatus and method steps in accordance with the principles of this disclosure. It is to be understood that other embodiments may be utilized, and that structural, functional and procedural modifications may be made without departing from the scope and spirit of the present disclosure.

The steps of methods may be performed in an order other than the order shown and/or described herein. Method embodiments may omit steps shown and/or described in connection with illustrative methods. Method embodiments may include steps that are neither shown nor described in connection with illustrative methods. Illustrative method steps may be combined. For example, an illustrative method may include steps shown in connection with any other illustrative method.

Apparatus may omit features shown and/or described in connection with illustrative apparatus. Apparatus embodiments may include features that are neither shown nor described in connection with illustrative apparatus. Features of illustrative apparatus may be combined. For example, an illustrative apparatus embodiment may include features shown or described in connection with another illustrative apparatus/method embodiment.

FIG. 1 shows a smart card 102 and a snap shot 106 of mobile device 108 in accordance with the principles of the disclosure. Smart card is shown with an in-built nano GPS chip 104. In some embodiments, nano GPS chip 104 may be visible on the surface of card 102. In other embodiments, nano GPS chip 104 may be embedded within card 102. In yet other embodiments, nano GPS chip 104 may be visible on the surface of the card but embedded within the thickness of the card.

Card 102 is preferably configured to send live updates—i.e., in real time—to mobile device 108. It should be noted that this preferably occurs absent a pairing step—but can include a pairing step as well. For example, a user can select the card stored in its database and/or click on the 'track' feature in the display of the mobile device. In certain embodiments, the location card may be displayed on a mobile device display. Certain embodiments may enable the mobile device to have access to all cards associated with the user via a mobile financial services application associated with the user.

Figure 2:
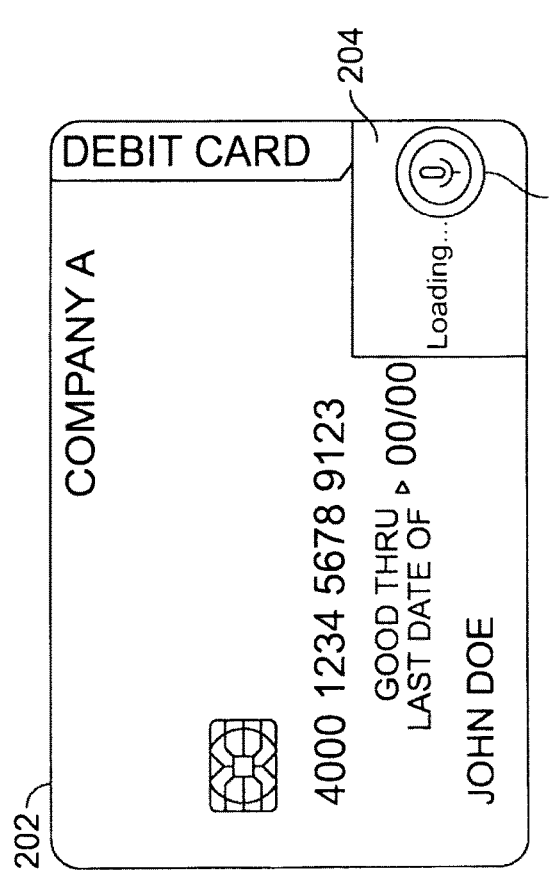
FIG. 2 shows a smart card in accordance with the principles of the disclosure.

FIG. 2 shows a smart card 202 in accordance with the principles of the disclosure. Smart card 202 preferably includes an audio and/or video module 204. Audio/video module may be located in region 204 and may include an audio/video chip 206.

Audio/video chip 206 may preferably include a microphone, a speaker and/or a video camera. Audio/video chip 206 may preferably be used to receive voice signals, provide audio signals and to provide video signals as needed. In such an embodiment, the microphone is preferably NLP-enabled and can be used to receive a user's voice signals. Card 202 can respond to the voice signals by locating nearby ATMs or other suitable locations.

In certain embodiments, audio/video chip 206 can be configured to retrieve video (or even still photography) of the smart card's physical environment. As such, the audio/video chip 206 can be used to identify the current location of the card, and transmit said information, even if the card's GPS is inoperable.

Figure 3:
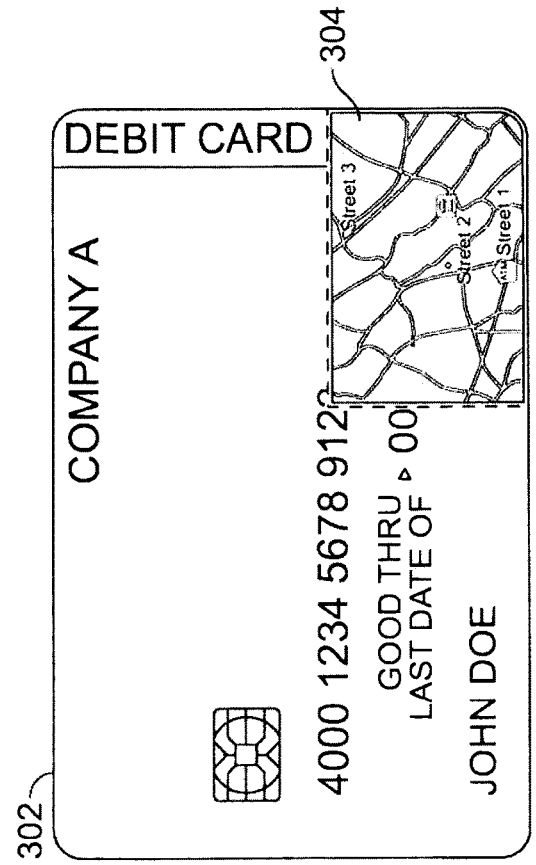
FIG. 3 shows another smart card in accordance with the principles of the disclosure.

FIG. 3 shows another smart card 302 in accordance with the principles of the disclosure. Smart card 302 provides a display screen 304. Display screen 304 preferably can be used to show the location of the nearest ATM location. Display screen 304 preferably can be used to show the location of the nearest financial services center location. It should be noted that, in certain embodiments, display screen 304 preferably can be used to provide a display of the location of the card preferably in real time. Preferably, no additional mobile device is required in FIG. 4 to help a user locate a nearby ATM.

Figure 4:
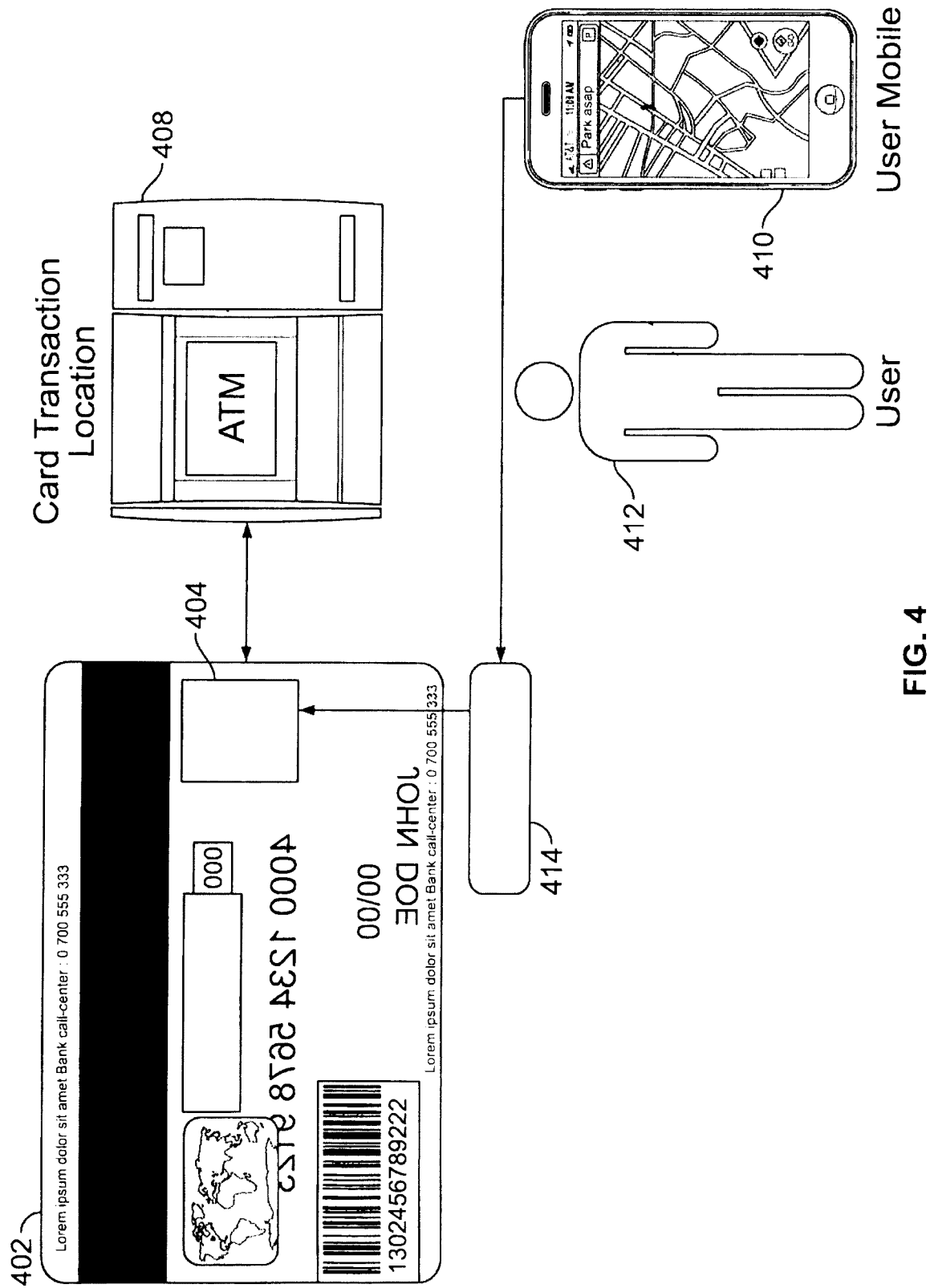
FIG. 4 shows a schematic diagram of a smart card and associated system in accordance with the principles of the disclosure.

FIG. 4 shows a schematic diagram of a smart card 402 and one embodiment of an associated system in accordance with the principles of the disclosure. FIG. 4 shows a user mobile device 410, a smart card 402, software 414 on the card, a communication channel between card 402 and ATM 408 (or other suitable device).

Preferably—the intelligence resident in the software 414 can be configured to compare, at the time of a card transaction such as at an ATM (or at a POS), the card 402 location with the user mobile 410 device location.

If the comparison prompts suspicion—e.g., where the card 402 location and the user mobile 410 device are substantially co-located—then the software 414 on the card 402 can either deny the transmission, require additional security to complete the transaction or permit the transaction.

Figure 5:
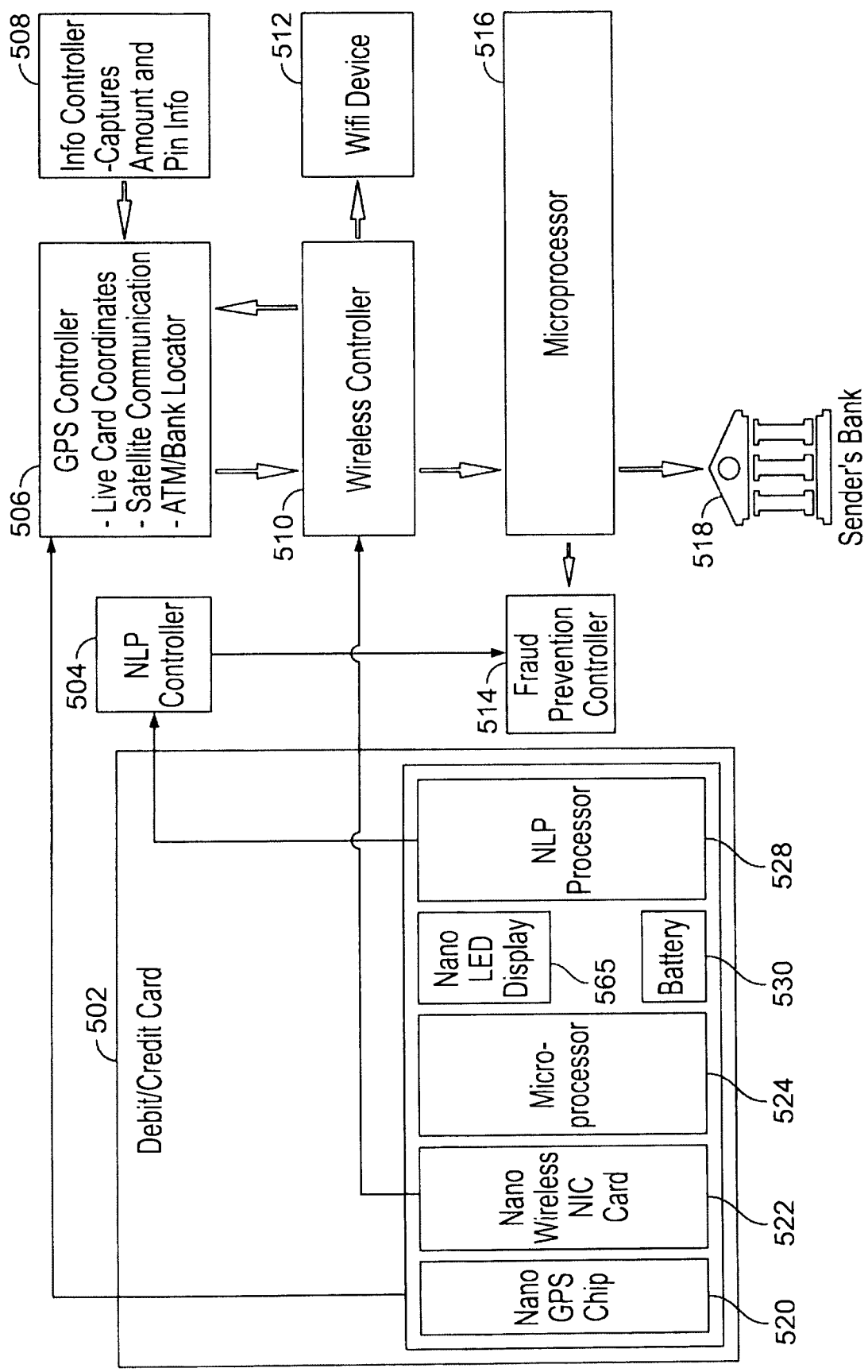
FIG. 5 shows another schematic diagram of a smart card and associated system in accordance with the principles of the disclosure.

FIG. 5 shows another schematic diagram of a smart card 502 and associated system in accordance with the principles of the disclosure. FIG. 5 shows, as part of card 502, a nano GPS chip 520, a nano wireless NIC card, a microprocessor 524, battery 530, a nano LED display 565 and an NLP processor 528.

Nano wireless NIC card may interface between a payment network, GPS network and/or other relevant communications network. Microprocessor 524 preferably governs the operations of components resident on card 502.

Smart card 502 may include a speaker (not shown in FIG. 5) for receiving input and providing output to a user. The speaker may be controlled by a voice controller and have information interpreted by NLP processor 528.

Microprocessor 524 may control overall operation of smart card 502 and its associated components. For example, microprocessor 524 may activate or deactivate nano GPS chip 520 for periodic GPS information. Microprocessor 524 may activate or deactivate nano wireless NIC card 522 for network or other communications. Microprocessor 524 may activate or deactivate nano LED display 565 for controlling a display on the card 502. Microprocessor 524 may activate or deactivate NLP Processor 528 for processing, as needed, voice information. Battery 530 may be used for powering card 502 and the components include therein.

Microprocessor 524 may activate or deactivate and otherwise control operation of any component of smart card 502. Microprocessor may run machine readable instructions that direct operation of microprocessor 524. For example, based on detecting a communication channel associated with an external device, microprocessor may activate one or more components of smart card 502.

Microprocessor 524 may activate or deactivate components of smart card 502 based on a location of smart card 502. For example, microprocessor 524 may send a signal via nano wireless NIC card 522 to external wireless controller 510 which may in turn, using a wired connection or Wifi device 512, communicate with fraud prevention controller 514 via external microprocessor 516 in order to deny a transaction when a user's mobile device has been determined to be more than a threshold distance from the user's smart card 502.

As described above, smart card 502 also includes nano wireless NIC card 522. NIC card 522 may include a network interface or adapter. NIC card 522 may include hardware and/or software for establishing a communication channel with an ATM or other suitable device. NIC card 522 may be configured to implement protocols for wireless and/or wired communication with an ATM or other suitable device.

Nano GPS chip 520 may be utilized to determine a location of smart card 502. For example, based on a location of smart card 502, microprocessor 524 may determine whether smart card 502 is located in an authorized zone—e.g., such as within a pre-determined distance of the user's mobile device or any other suitably-determined zone—or an unauthorized zone.

FIG. 5 also shows additional illustrative external components that relate to card 502. For example, FIG. 5 shows an external NLP controller for providing a communications path between the NLP processor 528 and fraud prevention controller 514. Such a communications path preferably enables a user to verbally communication information that may be relevant to a remote fraud determination regarding card 502.

In addition, another external component is GPS controller 506. GPS controller 506 preferably provides, for example, at a distance from card 502, live card coordinates satellite communication with card and an ATM/branch locator.

Also, information controller 508 may capture amount and/or PIN info from an ATM transaction and forward such information along—in order to help vet the validity of a recent ATM (or POS) transaction. Microprocessor 516 may provide an external command of remote operations of some or all the external components. Microprocessor 516 may also govern interactions, such as authorizations, reporting, etc., with the sender's bank 518 or other financial institution.

In certain embodiments involving an ATM (now shown directly in FIG. 5), an ATM-side communication controller may include a network interface or adapter. The communication controller may include hardware and/or software for establishing a communication channel with smart card 502. The communication controller may be configured to implement protocols for wireless and/or wired communication with smart card 502.

The communication controller may receive transaction instructions stored locally on smart card 502 via a communication interface, such as wireless controller 510 via wifi device 512. The communication controller may establish a wired or contact based connection with smart card 502. The communication controller may establish a wireless connection with smart card 502. For example, the communication controller may include an NFC reader or a Wi-Fi antenna (as shown in 512).

The communication controller may include a card reader (not shown) for establishing a wired connection with smart card 502. The card reader may include circuitry for interacting with smart card 502. For example, the communication controller may include one or more read heads. The read head(s) may include a plurality of sub-heads that are positioned to extract information encoded on the smart card 502. The sub-heads may be positioned based on target chip locations as defined in ISO 7816, which is hereby incorporated herein by reference in its entirety.

Figure 6:
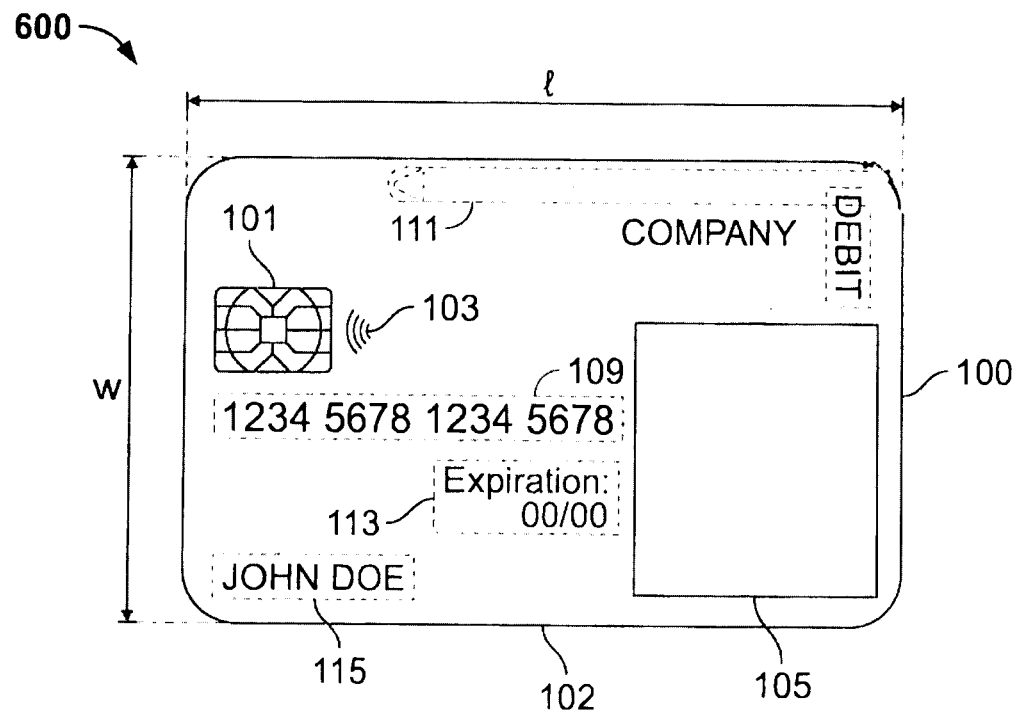
FIG. 6 shows illustrative apparatus in accordance with principles of the disclosure.
Figure 6:
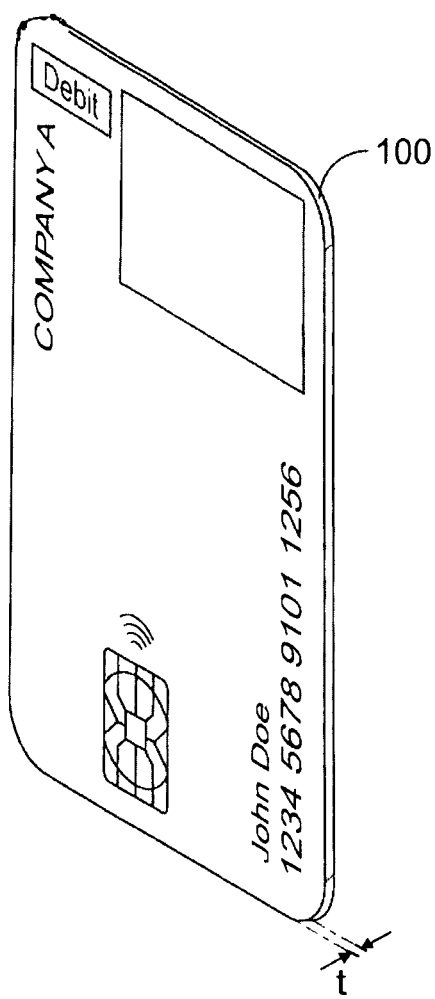

FIG. 6 shows an illustrative view of smart card 100. FIG. 6 shows that smart card 100 has width w and length 1. Smart card 100 may be any suitable size. For example, width w may be 53.98 millimeters ("mm"). Length 1 may be 85.60 mm. Smart card 600 has a thickness t. An illustrative thickness may be 0.8 mm. FIG. 6 shows that thickness t may be 0.8 mm.

An exemplary form factor of smart card 100 may be 53.98 mm×85.60 mm×0.8 mm. This exemplary form factor may allow smart card 600 to slide into a card holding sleeve in a user's wallet or to be placed in a user's pocket. This exemplary form factor may allow smart card 600 to fit into a card reader of an ATM or other similar type device.

Thus, a disclosure relating to live card tracking is provided. Persons skilled in the art will appreciate that the present invention can be practiced by other than the described embodiments, which are presented for purposes of illustration rather than of limitation. The present invention is limited only by the claims that follow.

What is claimed is:

1. A smart card that reduces fraud associated with the smart card, the smart card comprising:
   a communication interface comprising at least one electrical contact;
   a housing;
   a keypad;
   a microprocessor embedded in the housing, the microprocessor comprising a non-transitory memory location;
   a battery for powering the communication interface and the microprocessor;
   an EMV chip, located within the housing and in electronic communication with the communication interface and the microprocessor, where the EMV chip contains a built-in security protocol;
   a nano GPS chip, located within the housing and in electronic communication with the communication interface and the microprocessor, the nano GPS chip for determining the location of the smart card; and
   executable instructions stored in a non-transitory memory at the non-transitory memory location in the microprocessor, that when run by the microprocessor:
      provides authentication information to an automated teller machine (ATM) or Point of Sale (POS) device;
      determines a location of the smart card in response to a request, said request received from the ATM or POS device, for a smart card transaction authorization for a pre-determined transaction;
      receives, via the communication interface, a location of a mobile device associated with a specified user of the smart card;
      formulates a location delta based on the location of the smart card and the location of the mobile device;
      if the location delta is greater than or equal to a threshold distance, denies the request for smart card transaction authorization; and
      if the location delta is less than the threshold distance, then grants the request for smart card transaction authorization;
   wherein providing authentication information to the ATM or POS device further comprises:
   the EMV chip providing a verification of the authentication information of the smart card; and
   the smart card providing authentication information about the user obtained from the user by:
   receiving data entered on the keypad by the user;
   encrypting the authentication information;
   storing the authentication information; and
   transferring the authentication information to the ATM or POS device;
   wherein the smart card transaction authorization for a pre-determined transaction further comprises transaction instructions received from the user and formatted by the microprocessor for processing by the ATM or POS device where the ATM or POS device does not prompt the user for additional data relating to the pre-determined transaction; and
   wherein the communication interface comprising at least one electrical contact and the executable instructions, when run by the microprocessor, triggers execution of the transaction at one of the ATM and the POS device by establishing a contact-based wired communication channel using the EMV chip with one of the ATM and the POS device.

2. The smart card of claim 1 further comprising a display screen configured to present location information derived from the nano GPS chip, as translated by the microprocessor.

3. The smart card of claim 2, the executable instructions, when run by the microprocessor, that configure the display screen to present location information of a nearby Automated Teller Machine, said information derived from an electronic communication received by the communications interface from a remote location.

4. The smart card of claim 1, the executable instructions, when run by the microprocessor:
   trigger a periodic update transmitted from the communication interface to the mobile device, said periodic update that sets forth the location of the smart card.

5. The smart card of claim 1, wherein the housing and the nano GPS chip, when seated within the housing, collectively have a thickness that is not greater than 0.8 millimeters ("mm").

6. The smart card of claim 1, wherein the housing comprises a thickness not greater than 0.8 millimeters ("mm") and a surface area not greater than 86 mm×54 mm.

7. The smart card of claim 1, wherein the smart card further comprises a microphone, the smart card configured:
   to receive, using the microphone, analog voice signals;
   to convert the voice signals received by the microphone into digital signals using Natural Language Processing (NLP);
   to use the microprocessor to convert the digital signals into readable text; and
   to store the converted digital signals.

8. The smart card of claim 1, wherein the smart card further comprises a speaker, the smart card configured:
  to convert digital sound signals generated by the smart card into comprehensible analog signals; and
  to play the analog signals using the speaker.

9. A system comprising a smart card having a thickness not greater than 0.8 millimeters ("mm") and a surface area not greater than 86 mm×54 mm, the system comprising:
  a communication interface comprising at least one electrical contact;
  a housing;
  a keypad;
  a microprocessor embedded in the housing, the microprocessor comprising a non-transitory memory location;
  a battery for powering the communication interface and the microprocessor;
  an EMV chip, located within the housing and in electronic communication with the communication interface and the microprocessor, where the EMV chip contains a built-in security protocol;
  a nano GPS chip, located within the housing and in electronic communication with the communication interface and the microprocessor, the nano GPS chip for determining the location of the smart card; and
  executable instructions stored in a non-transitory memory at the non-transitory memory location in the microprocessor, that when run by the microprocessor:
    provides authentication information to an automated teller machine (ATM) or Point of Sale (POS) device;
    determines a location of the smart card in response to a request, said request received from the ATM or POS device, for a smart card transaction authorization for a pre-determined transaction;
    receives, via the communication interface, a location of a mobile device associated with a specified user of the smart card;
    formulates a location delta based on the location of the smart card and the location of the mobile device;
    if the location delta is greater than or equal to a threshold distance, denies the request for smart card transaction authorization; and
    if the location delta is less than the threshold distance, then grants the request for smart card transaction authorization;
  wherein providing authentication information to the ATM or POS device further comprises:
  the EMV chip providing a verification of the authentication information of the smart card; and
  the smart card providing authentication information about the user obtained from the user by:
  receiving data entered on the keypad by the user;
  encrypting the authentication information;
  storing the authentication information; and
  transferring the authentication information to the ATM or POS device;
  wherein the smart card transaction authorization for a pre-determined transaction further comprises transaction instructions received from the user and formatted by the microprocessor for processing by the ATM or POS device where the ATM or POS device does not prompt the user for additional data relating to the pre-determined transaction; and
  wherein the communication interface comprising at least one electrical contact and the executable instructions, when run by the microprocessor, triggers execution of the transaction at one of the ATM and the POS device by establishing a contact-based wired communication channel using the EMV chip with one of the ATM and the POS device.

10. The smart card of claim 9 further comprising a display screen configured to present location information derived from the nano GPS chip, as translated by the microprocessor.

11. The smart card of claim 9, the executable instructions, when run by the microprocessor, that configure the display screen to present location information of a nearby Automated Teller Machine, said information derived from an electronic communication received by the communications interface from a remote location.

12. The smart card of claim 9, the executable instructions, when run by the microprocessor:
  trigger a periodic update transmitted from the communication interface to the mobile device, said periodic update that sets forth the location of the smart card.

13. The smart card of claim 9, wherein the housing and the nano GPS chip, when seated within the housing, collectively have a thickness that is not greater than 0.8 millimeters ("mm").

14. The smart card of claim 9, wherein the smart card further comprises a microphone, the smart card configured:
  to receive, using the microphone, analog voice signals;
  to convert the voice signals received by the microphone into digital signals using Natural Language Processing (NLP);
  to use the microprocessor to convert the digital signals into readable text; and
  to store the converted digital signals.

15. The smart card of claim 9, wherein the smart card further comprises a speaker, the smart card configured:
  to convert digital sound signals generated by the smart card into comprehensible analog signals; and
  to play the analog signals using the speaker.

16. A method for use with a smart card, the smart card having a communication interface comprising at least one electrical contact, a housing, a keypad, a microprocessor embedded in the housing, the microprocessor comprising a non-transitory memory location, a battery for powering the communication interface and the microprocessor, an EMV chip, located within the housing and in electronic communication with the communication interface and the microprocessor, where the EMV chip contains a built-in security protocol, a nano GPS chip, located within the housing and in electronic communication with the communication interface and the microprocessor, a thickness not greater than 0.8 millimeters ("mm") and a surface area not greater than 86 mm×54 mm, the method comprising:
  providing authentication information to an automated teller machine (ATM) or Point of Sale (POS) device;
  determining, using the nano GPS chip, a location of the smart card in response to a request, said request received from the ATM or POS device, for a smart card transaction authorization for a pre-determined transaction;
  receiving, via the communication interface, a location of a mobile device associated with a specified user of the smart card;
  calculating a location delta based on the location of the smart card and the location of the mobile device;
  if the location delta is greater than or equal to a threshold distance, denying the request for smart card transaction authorization; and if the location delta is less than the threshold distance, then granting the request for smart card transaction authorization;
wherein providing authentication information to the ATM or POS device further comprises:
the EMV chip providing a verification of the authentication information of the smart card; and
the smart card providing authentication information about the user obtained from the user by:
receiving data entered on the keypad by the user;
encrypting the authentication information;
storing the authentication information; and
transferring the authentication information to the ATM or POS device;
wherein the smart card transaction authorization for a pre-determined transaction further comprises transaction instructions received from the user and formatted by the microprocessor for processing by the ATM or POS device where the ATM or POS device does not prompt the user for additional data relating to the pre-determined transaction; and
wherein the method further comprises triggering execution of the transaction at one of the ATM and the POS device by establishing a contact-based wired communication channel using the EMV chip with one of the ATM and the POS device.

* * * * *